United States Patent [19]

Feenick

[11] Patent Number: 4,638,919
[45] Date of Patent: Jan. 27, 1987

[54] VEHICLE FUEL TANK CONSTRUCTION
[76] Inventor: Robert A. Feenick, 20 Buchanan St., Pearl River, N.Y. 10965
[21] Appl. No.: 846,275
[22] Filed: Mar. 31, 1986
[51] Int. Cl.<sup>4</sup> .............................................. B65D 41/04
[52] U.S. Cl. ............................. 220/288; 220/DIG. 33
[58] Field of Search ................... 220/288, 85 F, 86 R, 220/DIG. 33; 116/28 R; 206/459

[56] References Cited
U.S. PATENT DOCUMENTS
4,223,799  9/1980  Eyster et al. ......................... 220/288
4,529,099  7/1985  Zerrer .................................. 220/288

Primary Examiner—George T. Hall
Attorney, Agent, or Firm—Arthur T. Fattibene

[57] ABSTRACT

A vehicle fuel tank construction which includes a body portion defining a reservoir for a supply of diesel fuel and having a fuel inlet which is provided with a threaded portion or adaptor to which a seal cap or closure is detachably connected. The sealing cap and fuel inlet or adaptor are provided with complementary mating surfaces or threads which will function as a conscience indicator to alert a filling station attendant or person that the tank requires diesel fuel. This is attained by providing the tank cap with complementary thread portion requiring the attendant to remove the cap in a manner opposite to that required of gas tanks used for gasoline. Also, the tank cap may be made in a shape other than round.

5 Claims, 3 Drawing Figures

VEHICLE FUEL TANK CONSTRUCTION

FIELD OF INVENTION

This invention is directed to a vehicle fuel tank for use on vehicles using diesel fuel.

PROBLEM AND PRIOR ART

Many vehicles on the road today are powered by diesel fuel. With the increasing use of diesel powered vehicles, it has been noted that there is an ever increasing amount of confusion whereby car owners and/or station attendants will inadvertantly fill a diesel fuel tank with gasoline, rather than diesel fuel. This is because the fuel inlet of a tank, whether filled with gasoline or diesel fuel, are all similar in construction. Therefore, a filling station attendant frequently will not notice what kind of fuel is required. Where the wrong type of fuel is placed in such tanks, there occurs considerable inconvenience and/or damage, as a diesel powered vehicle will not operate on gasoline and vice versa. This confusion occurs generally for the reason that there is no reliable indicator to warm and/or alert the filling attendant or car owner that diesel fuel is required to be placed in the tank during a tank filling operation.

OBJECTS

An object of this invention is to provide a simple, reliable warning or indicator to consciously alert a station attendant or person fueling a vehicle that diesel fuel is required.

Another object is to provide a warning device for use on a fuel tank of a diesel powered vehicle which can be incorporated in the original fuel tank, or which can be readily adapted to an existing fuel tank.

Another object is to provide a warning device or indicator for use with a diesel fuel tank that is simple and inexpensive to fabricate and which is positive in operation.

SUMMARY OF THE INVENTION

The foregoing objects and other features and advantages are attained by a fuel tank for diesel powered vehicles in which the fuel inlet to the fuel tank is provided with an external thread which is constructed with a thread design of opposite hand to that used in a fuel tank for gasoline powered vehicles. Also in conjunction with such thread construction, the cap or closure for sealing the inlet to the fuel tank may be shaped in a configuration other than round. For existing fuel tanks utilizing a conventional thread design, which is common to both diesel and gasoline fuel tanks, the present invention contemplates an adaptor which can be secured to the inlet of a conventional fuel tank and which adaptor is provided with an external threaded construction formed with threads of opposite hand rotation from that used on the conventional tank inlets. In this manner, the attendant filling the tank is immediately alerted to the type of fuel to be placed in the tank by noting the rotation required for effecting the removal of the tank cap.

FEATURES

A feature of this invention is to provide a diesel fuel tank with a fuel inlet having an external thread construction of opposite hand to that of a gasoline fuel tank whereby an attendant is alerted to the type of fuel to be placed in the tank by noting the rotation of the tank cap.

Another feature resides in the provision of an adaptor fitted to the inlet of a conventional tank which is provided with threads of opposite rotation for securing the tank cap or closure thereto.

Other features and advantages will become more readily apparent when considered in view of the drawing and disclosure in which.

DETAILED DESCRIPTION

Figure 1:
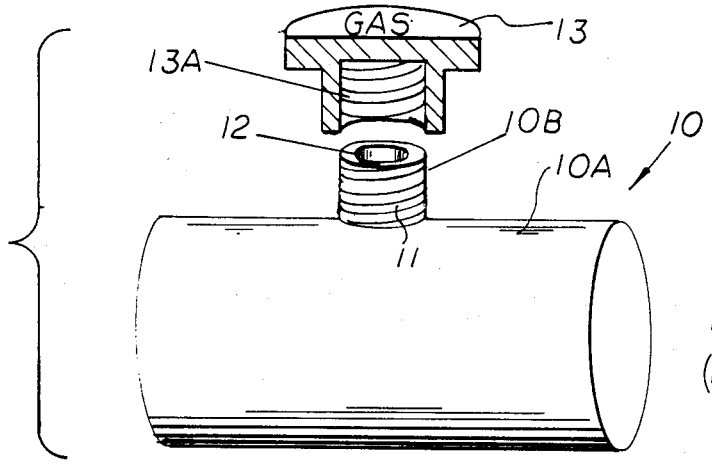
FIG. 1 illustrates a conventional type gasoline tank.

Referring to the drawings, there is shown in FIG. 1 a fuel tank 10 of conventional construction which is used in a motor vehicle or the like for containing a supply of fuel. Such tanks are used for both gasoline or diesel fuel. The tank generally includes a body portion 10A defining the main reservoir for containing the fuel and a fuel inlet 10B. Conventionally, such fuel inlets 10B are provided with external threads 11 adjacent the inlet opening 12 which consist of a right hand thread for receiving a screw on cap 13. As shown, the screw on cap or closure 13 is provided with complementary threads 13A for mating with threads 12 and which caps 13 are round in configuration.

Heretofore, such tanks 10 of the general construction described are used in diesel powered vehicles and gas powered vehicles. For this reason, it frequently happens that the wrong fuel is placed in the tank, which creates serious problems and inconvenience in such event.

To obviate this problem, the present invention contemplates a tank construction 20 which includes a body or reservoir portion 21 having a fuel inlet or conduit 22 which is provided with opposite hand threads 23 adjacent the inlet opening 24. The cap or closure 25 for sealing opening 24 is provided with complementary threads 26 for mating with threads 23. Also, it is preferred that the cap or closure 25 is provided with a configuration which is other than round so as to distinguish the same from a conventional gas inlet cap 13. The illustrated cap 25, for example, may be of a polygonical design.

With the construction of tank 20 described, it will be apparent that a fuel attendant will be alerted to the fact that the opposite rotation necessary to effect the removal of the tank cap 25 alerts him that diesel fuel is required. Also, the odd configuration of the tank cap will further alert the filling station attendant to pay greater attention to the type of fuel to be placed in the tank.

Figure 2:
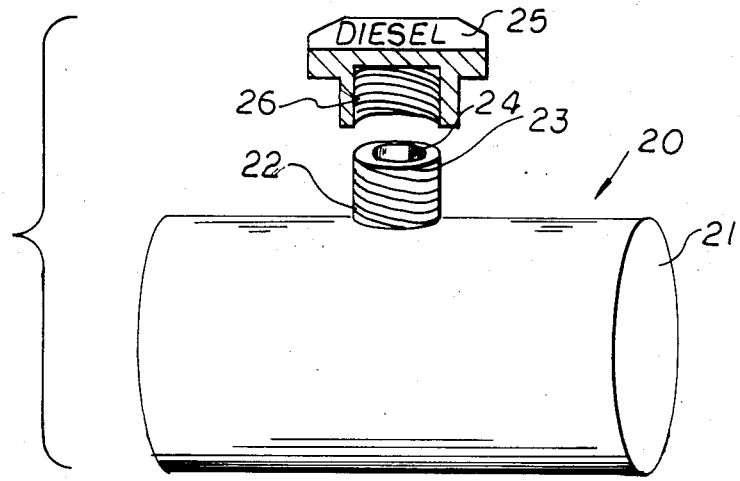
FIG. 2 is an exploded side view of a fuel tank embodying the invention.
Figure 3:
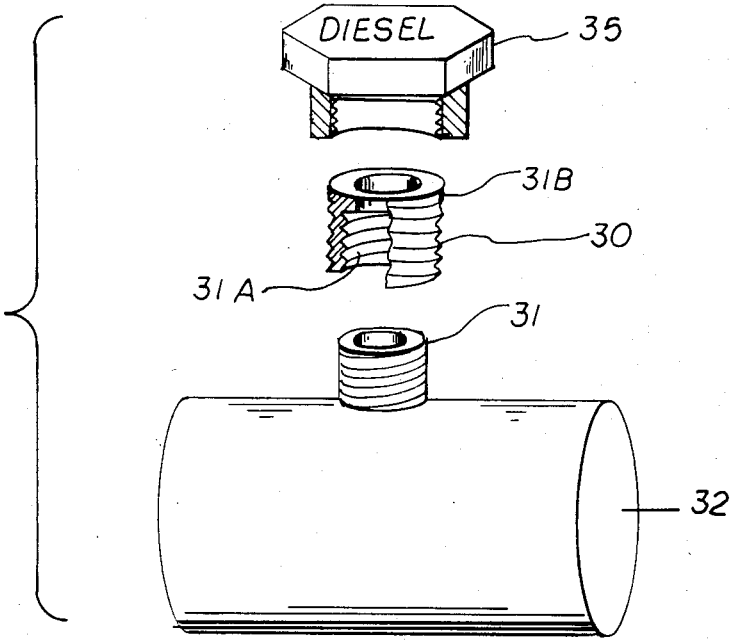
FIG. 3 is a side view of a modified embodiment.

FIG. 3 illustrates a modified form of the invention, whereby the invention or concept herein described can be applied to an existing tank. As shown, the modification of FIG. 3 comprises an adaptor 30 which can be fitted to the fuel inlet 31 of a conventional tank 32 of the type described with respect to FIG. 1. The adaptor 30 comprises a nipple or extension having adjacent one end thereof internal threads 31A adapted to complement the conventional right hand threads of the fuel inlet 31. The other end, 31B, of the adaptor is provided with external threads of an opposite hand rotation, e.g. left hand rotation. A closure or cap 35, such as described in FIG. 2, can thus be detachably secured to end 31B of the adaptor. From the foregoing, it will be apparent that the adaptor 30 readily converts a conventional tank to a diesel fuel tank embodying the present invention.

While the invention has been described with respect to several modifications, it will be apparent that variations and modifications can be made without departing from the spirit or scope of the invention.

What is claimed is:

1. A fuel tank construction for use with diesel powered vehicles comprising
    a body portion defining a reservoir for containing a supply of diesel fuel,
    means defining a fuel inlet connected to said body portion,
    said inlet comprising a filling tube having an inlet opening connected in communication with said body,
    and a cap defining a closure for said inlet opening,
    said filling tube and cap having complementary means thereon for detachably connecting said cap to said filling tube for sealing said opening,
    and said complementary means functioning as an indicator to alert a filling attendant that the tank should be filled with diesel fuel.

2. A fuel tank construction as defined in claim 1 wherein said complementary means includes a left handed threaded connection for connecting said cap to said filling tube.

3. For use in a vehicle having a fuel tank adapted to contain a supply of diesel fuel wherein said fuel tank includes a connected filling tube having a threaded connection adjacent the inlet opening for detachably connecting a sealing cap thereto, the improvement wherein said filling tube is provided with an externally threaded portion adjacent the upper end thereof, said threaded portion being opposite in hand relative to that of a fuel tank for holding gasoline, and a closure having complementary threads for mating with said opposite threaded portion about said filling tube.

4. A fuel tank construction for use on a vehicle comprising
    a body portion defining a reservoir for containing a supply of diesel fuel,
    a fuel inlet having an inlet opening connected to said body portion,
    said fuel inlet having a thread portion adjacent said inlet opening,
    an adapter means forming an extension of said fuel inlet,
    said adapter means comprising a tubular member having an internal threaded portion at one end and an external threaded portion at the other end thereof,
    said internal threads complementing the threaded portion of said fuel inlet,
    and said external threaded portion being left handed threads,
    and a cap defining a closure for said adaptor means,
    said cap having internal threads complementing said external threads to mate therewith.

5. A fuel tank construction as defined in claim 4 wherein said cap is defined by a non-circular configuration.

* * * * *